Jan. 5, 1954 KARL-HUGO LARSSON 2,664,660
SHEARING BOARD, PARTICULARLY FOR FISHING TRAWL NETS
Filed March 24, 1950 2 Sheets-Sheet 1
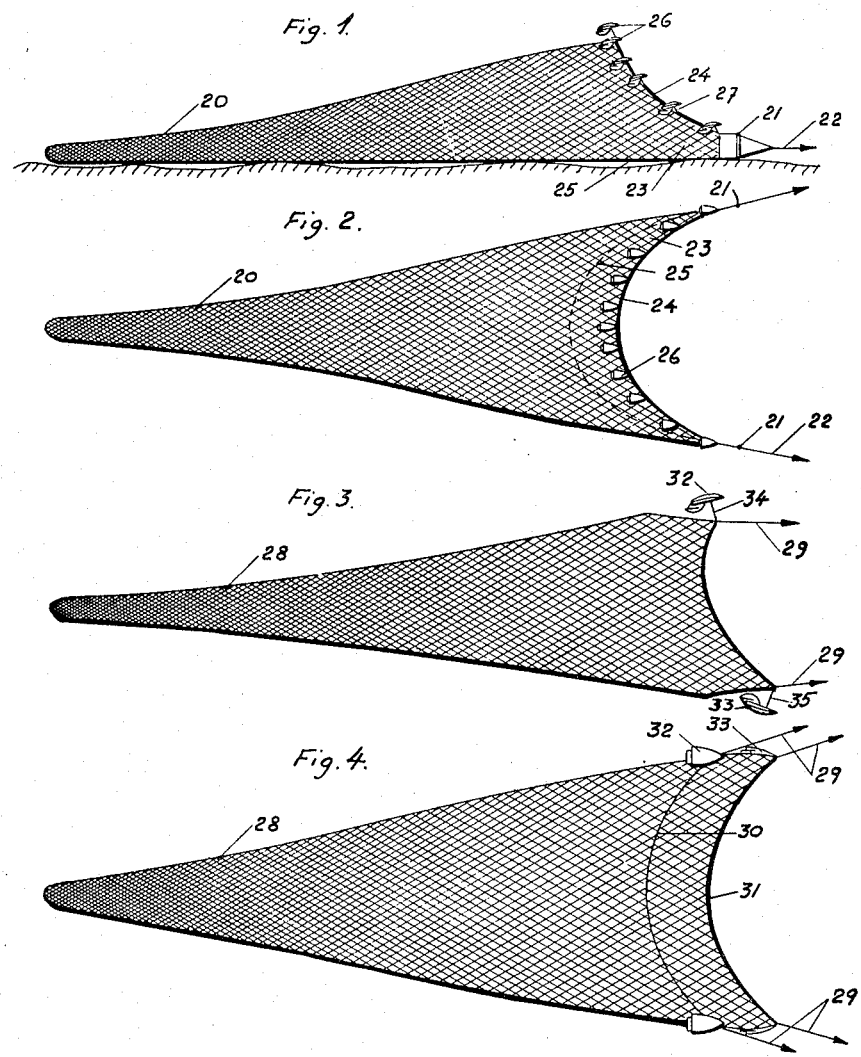

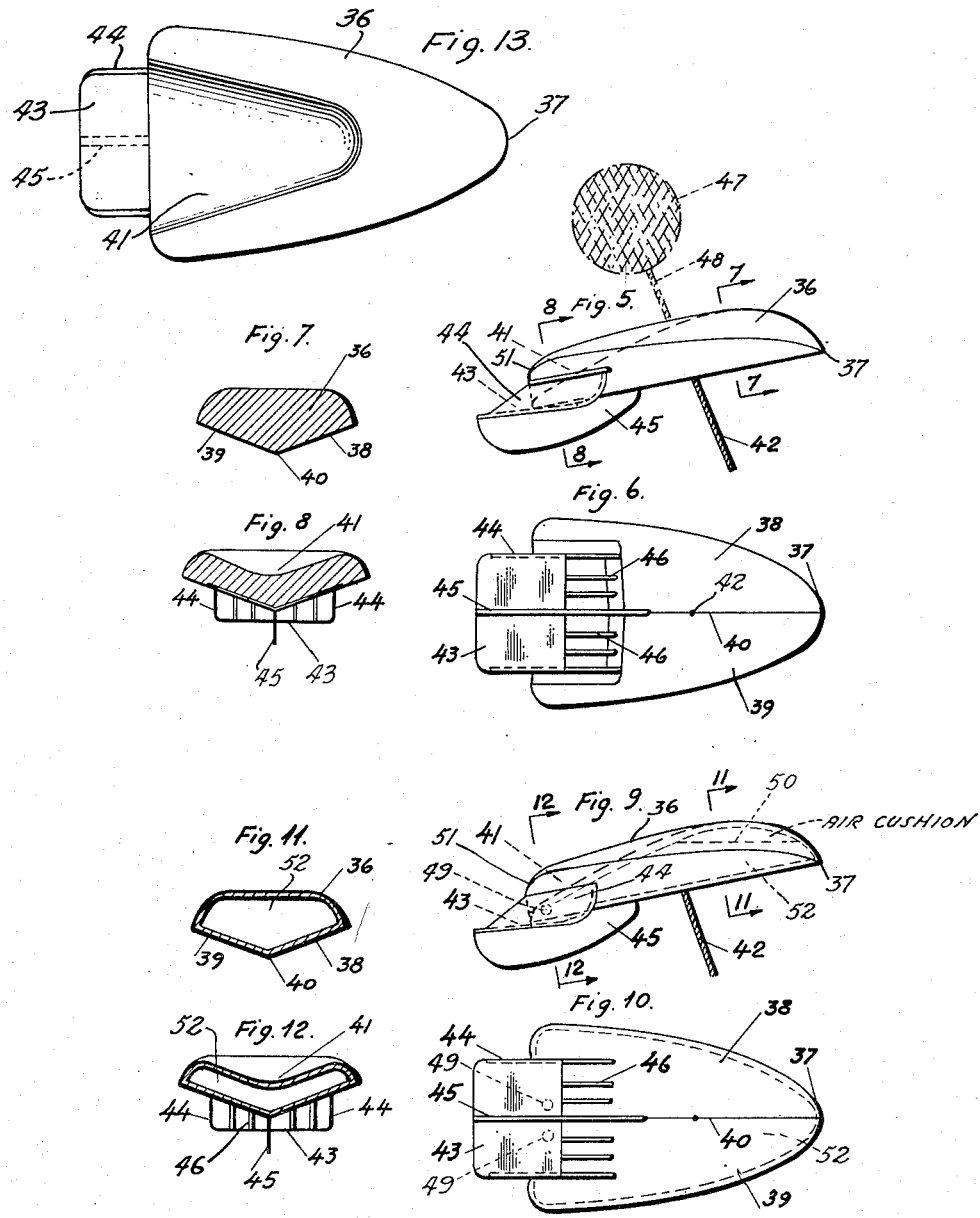

Patented Jan. 5, 1954

2,664,660

UNITED STATES PATENT OFFICE 2,664,660

SHEARING BOARD, PARTICULARLY FOR FISHING TRAWL NETS

Karl-Hugo Larsson, Stockholm, Sweden

Application March 24, 1950, Serial No. 151,747

Claims priority, application Sweden April 1, 1949

13 Claims. (Cl. 43—9)

For the purpose of keeping the mouth of an ordinary fishing trawl net open use is commonly made of trawl doors or trawl boards, which slide standing on edge along the bottom of the sea while set in a certain angle to the direction of movement, so that their shearing forces strive to open the trawl net in a lateral direction, furthermore, of floats, usually in the form of glass balls, which are secured to the head rope and serve to keep the trawl net roof lifted, and finally of weights secured to the foot rope, which serve to keep the foot rope down. On larger trawl nets there is sometimes provided on the head rope, as an aid to the floats, a so-called third board which is arranged to exert an upwardly directed shearing force. The said third board usually consists of a plane wooden board, which is secured to the head rope and trawl net by means of a plurality of crown knots. Such lifting trawl boards cannot be attached at any desired position on the arms or wings of the trawl net, however, and therefore cannot be used to replace the floats.

Glass balls have the advantage of being attachable to the head rope of the trawl net by means of a single cord, but the use of glass balls also entails considerable disadvantages. Thus, their lifting power is limited to the displacement less their own weight. Furthermore, they present, due to their form, a great towing resistance, and when the trawl net is being towed there are set up, after each ball, whirls in the water which may scare away some of the fish in front of the mouth of the trawl. It has also for a long time been desired to be able to substitute for the glass balls other more effective lifting means. It has even been proposed to use, instead of floating glass balls, shearing boards provided with fixed horizontal and vertical stabilizing tail fins and with a number of towing cords attached to the under side of their body part. These proposals, however, have never led to any practical results, in the first instance because of an unsuitable shaping of the body part of the shearing board, which has caused the same to have an unstable travel through the water, to be liable to get entangled in the net and to have a small lifting power in relation to the towing resistance.

The present invention has for its object to provide a shearing board having fixed vertical and horizontal stabilizing tail fins and adapted particularly for use in connection with fishing trawl nets, in which shearing board the inconveniences referred to above have been avoided through a particularly favourable shaping of the body part of the shearing board. According to the invention the body part of the shearing board is shaped so as to taper at its fore end to a rounded point with the width of the body part increasing from the fore end towards the rear end, and to present a pressure surface which substantially has the shape of an open V in cross section, said pressure surface being suitably composed of two intersecting plane surfaces, and a suction surface having a convexly rounded front portion merging into a channel shaped incurved or concave rear portion, so that the thickness of the body part decreases towards both ends from a maximum intermediate the ends.

A shearing board shaped in this manner has an entirely stable travel through the water, even when only one towing cord is attached to the pressure side of the body part, and the same will automatically take up a favourable operating position, when a force is applied in the towing cord, which happens when the trawl net commences to move through the water.

A shearing board according to the invention can be handled just as easily as a glass ball but has, compared with the glass ball, in the first instance the convenience that its lifting power increases with the speed of the trawl net in contrast to that of the glass ball, which rather decreases somewhat, when the speed of the trawl net is increased. Provided that the shearing board body is shaped in the most suitable manner it is possible to obtain with a shearing board of the same volume a lifting force which is more then three times as great as that of a glass ball at a trawl speed of three knots, whereas at a trawl net speed of four knots the lifting force becomes no less than about six times greater. This involves that in a trawl net provided with shearing boards according to the invention the trawl net mouth remains fully open practically independently of the speed at which the trawl net is being dragged through the water, whereas in a trawl net which is provided in the ordinary manner with glass balls as lifting members for the head rope, the mouth of the trawl net is pulled together in the vertical direction on an increase of speed, thereby reducing the mouth area of the trawl net and thus also the capacity of the trawl net of catching fish. The use of correctly shaped shearing boards also eliminates practically completely the formation of whirls in the water, involving a reduced towing resistance through the water.

The shearing boards according to the invention may also be used as substitutes for the glass balls in floating type trawl nets, and in the latter kind of trawl nets they may also be used as substitutes for the weights which keep the foot rope down. A lifting shearing board should be arranged so that, when at rest, it floats in the water with the pressure side turned downwards and with the front edge of the pressure side at a higher level than the rear edge, whereas a shearing board having a pulling down effect should be so heavy that the same is suspended, when at rest, from the towing cord with its pressure surface turned upwardly and with its weight distributed in such a manner on opposite sides of the attaching point of the latter that the front edge of the pressure surface will be positioned at a lower level than the rear edge. In this manner the shearing board is caused to take up, from the start, a correct operating position, so that it does not get entangled in the net when the trawl commences to move through the water.

Lifting shearing boards for attachment to the head rope may be made with a solid body part, preferably of a material which is lighter than water, e. g. wood. A shearing board having a solid body part may, if desired, be provided with an auxiliary float, for example consisting of a small glass ball, which by means of a single cord is secured to the back side or upper side of the body part. The body part may also be made hollow, suitably of metal, preferably light metal. If the hollow interior or cavity is entirely closed, the body part must be provided with powerful reinforcements capable of preventing the walls from collapsing under the action of the very high water pressure encountered in deep-sea fishing, or else measures should be taken to maintain substantially the same pressure in the hollow interior as outwardly of the body part. For example, it is possible to supply for said purpose in the lowermost portion of the body part a number of wall openings through which water can enter while compressing the air entrapped in the cavity, when the water pressure outside of the shearing board increases, and through which the water can flow out again under the action of the expanding air, when the trawl net is lifted to the surface.

Shearing boards which are intended to be used instead of weights at the lower side of the trawl net mouth are always made to sink in water, and are made preferably entirely of metal. Also in such shearing boards the body part may, however, be provided with a cavity of suitable size in order to reduce the total weight to the required minimum.

The self-stabilizing shearing board according to the invention may, of course, be used also for other purposes than for keeping the mouth of a fishing trawl net open.

The invention and its various features will be more fully understood with reference to the accompanying drawing. In the drawing:

Fig. 1 is a side view and Fig. 2 a top view of a bottom trawl net in catching position, provided with eleven shearing boards on the head rope.

Fig. 3 is a side view and Fig. 4 a top view of a floating trawl net with a square mouth in catching position, provided with four larger shearing boards, two of which have a lifting effect on the head rope and two of which serve to pull down the foot rope.

Fig. 5 is a side elevation of one of my shearing boards having a solid body and provided with an auxiliary float, Fig. 6 is a bottom view of the same shearing board, Fig. 7 is a sectional view, substantially vertical, taken along the line 7—7 of Fig. 5, Fig. 8 is a sectional view, substantially vertical, taken along the line 8—8 of Fig. 5, Fig. 9 is a side view of a modified shearing board having a hollow body, Fig. 10 is a bottom view of the shearing board of Fig. 9, Fig. 11 is a sectional view, substantially vertical, taken along the line 11—11 of Fig. 9, Fig. 12 is a sectional view, substantially vertical, taken along the line 12—12 of Fig. 9, while Fig. 13 is a plan view of the shearing boards, this view being identical for the two modifications.

In Figs. 1 and 2 the reference numeral 20 designates the trawl net of an ordinary bottom trawl provided with shoulder rods 21 and sweeping cables 22, the latter extending to the trawl doors, not shown. The trawl wings or trawl arms 23 are provided with a head rope 24 and a foot rope 25. Secured to the foot rope are a number of weights, not shown, which serve to cause the foot rope to follow the bottom of the sea, and on the head rope are provided eleven shearing boards made according to the invention, each shearing board being attached to the head rope by means of a single cord 27.

In Figs. 3 and 4 the reference numeral 28 designates the net of a so-called floating trawl net having a square mouth. Pulling wires 29 extend from the upper and lower corners of the mouth to shoulder rods, not shown, which in turn are connected in ordinary manner by means of sweeping cables to floating trawl doors, when a one boat trawl net is concerned, or connected through towing cables (the trawl net warp) directly to the two boats, when a two boat trawl net is concerned. In the trawl net shown the head rope 30 and the foot rope 31 are of equal length. At each corner of the mouth of the trawl net there is secured to the head rope or to the foot rope, respectively, a comparatively large shearing board 32 or 33, respectively, said shearing board being attached through a single rope 34 or 35, respectively. The upper shearing boards 32 are lighter than water and set in such a manner as to exert a lifting force on the head rope, whereas the lower shearing boards 33 are heavier than water and oppositely set to exert a pulling-down force on the foot rope.

In the embodiment of the shearing board according to the invention illustrated in Figs. 5 to 8 the body part 36 of the shearing board is solid and made of a material having a lower specific weight than water, e. g. wood. The body part has a greater length than width and tapers from the rear or tail portion towards the front or nose portion into a somewhat rounded point 37. The tapering shape shown ensures a stable travel of the shearing board through the water. The underside or pressure side has in cross section the shape of an open V and is formed of two plane surfaces 38 and 39, which intersect along a straight line 40 which extends in the longitudinal direction of the board. The upper side or suction side is shaped after a system of longitudinally extending smooth or streamline-shaped curves in such a manner, that the thickness of the body part has its maximum at a distance of about one third of its length reckoned from the front edge and decreases from said maximum towards both ends. The maximum thickness may be about one fourth to one fifth of the length of the body part. If a particularly high buoyancy is required, it may be suitable to select a maximum thickness of about one third of the length. In the rear portion the back or suction surface of the body part is shaped with a longitudinally extending channel shaped portion 41, so that the body part has substantially an even thickness at its rear edge 51, whereby the lifting power is increased.

The pulling cord 42 is attached to the body part 36 at the pressure side thereof at a point a short distance in front of the pressure centre. The horizontal stabilizing tail fin consists of a plane plate 43, which by means of angularly bent side portions 44 is secured to the pressure side of the body part of the shearing board behind the attaching point for the pulling line in such a position as to extend substantially in parallel relationship with the straight lower edge 40.

As a vertical stabilizing tail fin there is provided on the pressure side, also behind the pulling line, a plate 45 which is secured by welding to the horizontal stabilizing fin 43 and the plane of which coincides with the straight edge 40. In the fore mouth of the channel formed by the horizontal stabilizing fin 43 and the side portions 44, in the embodiment shown, a plurality of curved protecting guard wires 46 are provided which prevent the net from being sucked into the fin arrangement. Such protecting bars are, however, as a rule not needed. To increase their stabilizing effect both the horizontal fin and the vertical fin are arranged to project in part beyond the rear edge of the body part of the shearing board.

To prevent water from permeating into the interior of the solid body part under the action of the heavy pressure, which prevails at great depths, the body part may be provided with a surface coating which is impermeable to water. To secure the necessary buoyancy under all conditions it may sometimes be suitable to provide the shearing board with an auxiliary float, for example in the shape of a small glass ball 47 which by means of a single cord 48 is attached to the back side of the body part 36.

On account of the action of the stabilizing fins as a ballast the shearing board illustrated will, when at rest, float in the water with its pressure side turned downwards and with the front edge thereof positioned at a higher level than the rear edge, ensuring that the shearing board when towing commences, immediately takes up a correct operating position without getting entangled in the trawl net.

The embodiment of the shearing board shown in Figs. 9 to 12 differs from the one shown in Figs. 5 to 8 substantially only therein, that the body part 36 of the shearing board is made hollow and of metal, preferably of light metal. To prevent collapsing of the hollow body part the latter is provided in the wall plates 38 and 39 at the rear end of the pressure side and at opposite sides of the stabilizing fins with two holes 49 through which the interior of the body always communicates with the surroundings. When the trawl net is set out the hollow interior of the shearing board is filled with air. When during the towing of the trawl net the shearing board is pulled down to a greater depth, water is impressed through the holes 49 and compresses the entrapped air which forms a compressed air cushion, shown at 50 in Fig. 9, in the upper part of the cavity, so that the same pressure is always maintained in the cavity 52 as outside of the body. When the shearing board rises towards the surface of the sea on the taking home of the trawl net, the entrapped air will expand and press the water out through the holes 49 again. Small quantities of water, which may remain in the cavity, may readily be emptied by turning over the shearing board after it has been taken up on deck.

If the hollow interior of the shearing board body is permanently closed, interior mechanical reinforcements must be provided to prevent collapse of the body under the action of the high water pressure at greater depths.

When the shearing board instead of being used for effecting a lifting power is to be used for effecting a pulling down power, for example on the foot rope as is the case with the lower shearing board 35 in Fig. 3, the shearing board is made so heavy that the same, when at rest, becomes suspended in the pulling line with is pressure side turned upwardly, and the weight of the body part is so distributed with respect to the point of attachment that the front edge of the pressure side tends to take up a lower position than the rear edge.

The invention is, of course, not limited to the embodiments described above and illustrated on the drawing, and not either to the field of application indicated, but modifications of various kind are readily conceivable within the scope of the invention.

I claim:

1. A shearing board useful for attachment to fishing trawl nets, comprising in combination a body part tapering towards its front end in a rounded point, having a pressure surface substantially in the shape of an open V and a suction surface composed of a convexly rounded front portion and a channel-shaped rear portion merging thereinto so that the thickness of the body part decreases towards both ends from a maximum intermediate the ends, a vertical longitudinal stabilizing fin mounted centrally and towards the rear of the pressure surface and a horizontal stabilizing fin also mounted centrally and towards the rear of the pressure surface.

2. The shearing board of claim 1 wherein the body part has a maximum thickness at a distance from the fore end which is about one third the length of the shearing board body.

3. The shearing board of claim 1 wherein the thickness of the body part ranges from one third to one fifth of its length.

4. The shearing board of claim 1 wherein the body part is of substantially uniform thickness at its rear edge.

5. The shearing board of claim 1 wherein the body part has a length which exceeds its greatest width.

6. The shearing board of claim 1 wherein the body part is solid and constructed of a material having a lower specific weight than water.

7. The shearing board of claim 1 wherein the body part is hollow.

8. The shearing board of claim 1 wherein the body part is hollow defining a cavity and is provided with holes on the side turned downwardly in the water through which water can enter the cavity to compress the air trapped therein.

9. The shearing board of claim 1 wherein the horizontal and vertical stabilizing fins project rearwardly beyond the rear end of the body part of the board.

10. The shearing board of claim 9 wherein the horizontal stabilizing fin is mounted within the confines of the side edges of the body part of the board.

11. The shearing board of claim 1 wherein the board comprises vertical side fins which are spaced parallel from and on either side of said centrally mounted vertical stabilizing fin and which serve to support the said horizontal stabilizing fin, the said horizontal and vertical fins forming a channel beneath the pressure side of said shearing board.

12. The shearing board of claim 11 wherein the board comprises a plurality of guard wires mounted longitudinally on the board in front of the said channel to prevent the net from being pulled into the channel.

13. The shearing board of claim 1 wherein the board comprises a single pulling line attached to the pressure surface of the body part of the board for attachment to a trawl net.

KARL-HUGO LARSSON.

References Cited in the file of this patent

UNITED STATES PATENTS

| Number | Name | Date |
|---|---|---|
| 2,523,925 | Sorensen | Sept. 26, 1950 |

FOREIGN PATENTS

| Number | Country | Date |
|---|---|---|
| 7,687/27 | Australia | June 8, 1927 |
| 228,703 | Great Britain | Feb. 12, 1925 |
| 328,113 | Great Britain | Apr. 24, 1930 |
| 561,379 | France | Oct. 20, 1923 |